(12) United States Patent
Damnjanovic et al.

(10) Patent No.: US 11,871,270 B2
(45) Date of Patent: Jan. 9, 2024

(54) REASSEMBLY OF SERVICE DATA UNITS FOR RADIO LINK CONTROL DUPLICATION

(71) Applicant: QUALCOMM Incorporated, San Diego, CA (US)

(72) Inventors: Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 16/948,898

(22) Filed: Oct. 5, 2020

(65) Prior Publication Data

US 2021/0204168 A1    Jul. 1, 2021

Related U.S. Application Data

(60) Provisional application No. 62/956,106, filed on Dec. 31, 2019.

(51) Int. Cl.
| | |
|---|---|
| H04W 28/06 | (2009.01) |
| H04L 5/00 | (2006.01) |
| H04W 80/02 | (2009.01) |

(52) U.S. Cl.
CPC ......... *H04W 28/065* (2013.01); *H04L 5/0055* (2013.01); *H04W 80/02* (2013.01)

(58) Field of Classification Search
CPC .. H04W 28/065; H04W 80/02; H04L 5/0055; H04L 1/1887; H04L 1/1628; H04L 1/08; H04L 12/2838
See application file for complete search history.

(56) References Cited

U.S. PATENT DOCUMENTS 11,324,004 B2 * 5/2022 Babaei ................... H04W 76/11
2010/0274921 A1 * 10/2010 Lerzer ..................... H04L 69/12
709/234

(Continued)

FOREIGN PATENT DOCUMENTS

| EP | 3635900 A1 | 4/2020 |
| KR | 20190019000 A | 2/2019 |

OTHER PUBLICATIONS

Catt, et al., "Clarification on Function Split Option 3-1", 3GPP TSG RAN WG3 Meeting #94, 3GPP Draft, R3-162862, Clarification on Function Split Option 3-1, 3rd Generation Partnership Project (3GPP), Mobile Competence Centre, 650, Route Des Lucioles, F-06921 Sophia-Antipolis Cedex, France, vol. RAN WG3, No. Reno, Nevada, USA, Nov. 14, 2016-Nov. 18, 2016, Nov. 14, 2016 (Nov. 14, 2016), XP051178961, pp. 1-4, Retrieved from the Internet: URL: http://www.3gpp.org/ftp/Meetings_3GPP_SYNC/RAN3/Docs/ [retrieved on Nov. 14, 2016] figure 1, Section 2.

(Continued)

*Primary Examiner* — Omer S Mian
(74) *Attorney, Agent, or Firm* — Harrity & Harrity, LLP

(57) ABSTRACT

Various aspects of the present disclosure generally relate to reassembly of service data units (SDUs) for radio link control (RLC) duplication. In some aspects, a receiving device may receive, via a first RLC entity, one or more first protocol data units (PDUs) encapsulating a first portion of an SDU. The receiving device may receive, via a second RLC entity, one or more second PDUs encapsulating a second portion of the SDU, where the second PDUs are associated with duplication of the one or more first PDUs. The receiving device may assemble, based at least in part on a determination that neither the first portion nor the second portion is a complete version of the SDU, a combined SDU (Continued)

from the first portion and the second portion. Numerous other aspects are provided.

14 Claims, 9 Drawing Sheets

(56) References Cited

U.S. PATENT DOCUMENTS

| | | | | |
|---|---|---|---|---|
| 2017/0332435 | A1* | 11/2017 | Tenny | H04W 76/27 |
| 2018/0316619 | A1* | 11/2018 | Hong | H04L 47/34 |
| 2018/0368132 | A1* | 12/2018 | Babaei | H04L 5/0053 |
| 2019/0058550 | A1 | 2/2019 | Kim | |
| 2019/0098533 | A1* | 3/2019 | Babaei | H04L 1/1861 |
| 2019/0387535 | A1 | 12/2019 | Kim | |
| 2020/0021340 | A1* | 1/2020 | Tang | H04L 1/1887 |
| 2020/0358570 | A1* | 11/2020 | Liu | H04L 5/0044 |
| 2021/0007008 | A1* | 1/2021 | Gage | H04L 1/1896 |

OTHER PUBLICATIONS

International Search Report and Written Opinion—PCT/US2020/070744—ISA/EPO—dated Apr. 26, 2021.
Partial International Search Report—PCT/US2020/070744—ISA/EPO—dated Feb. 22, 2021.

\* cited by examiner

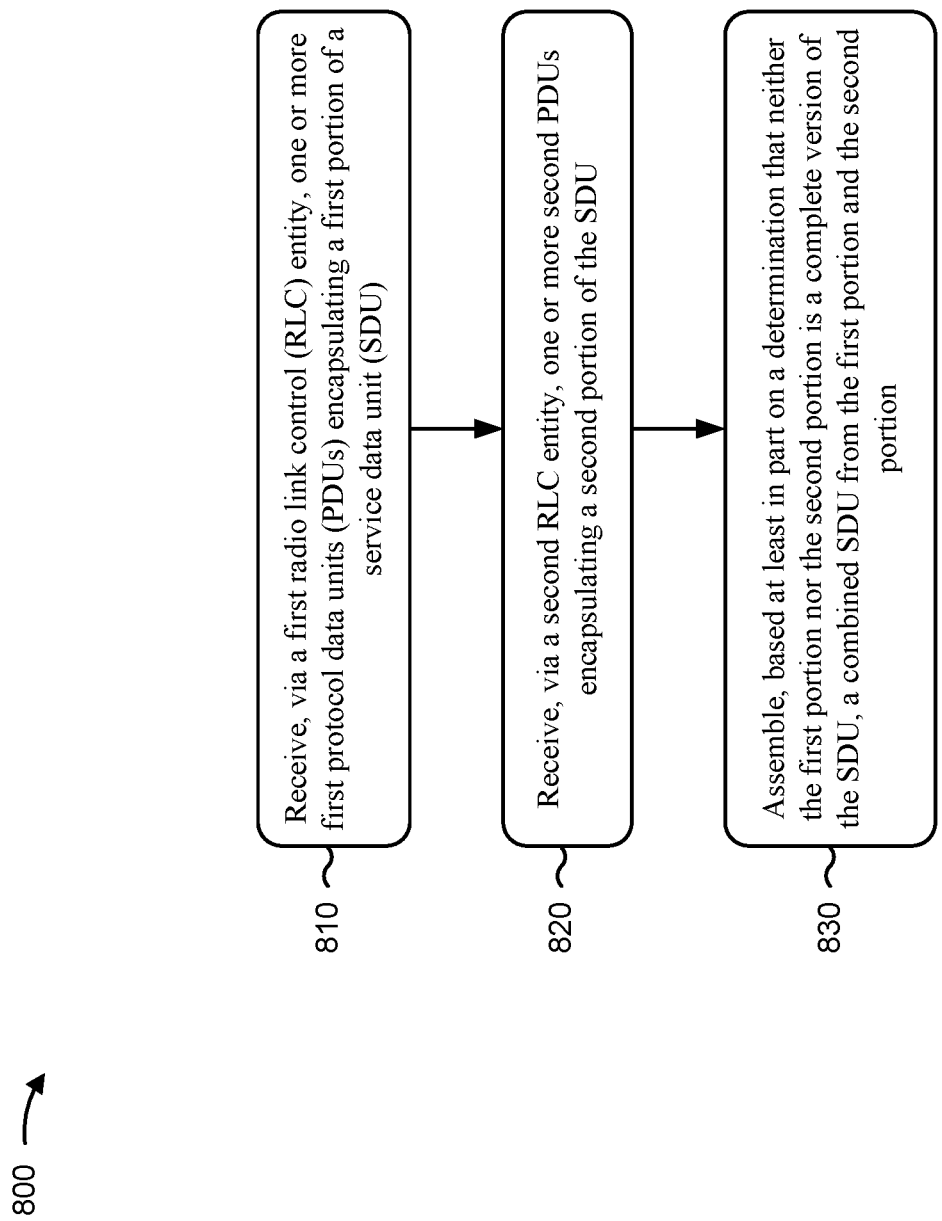

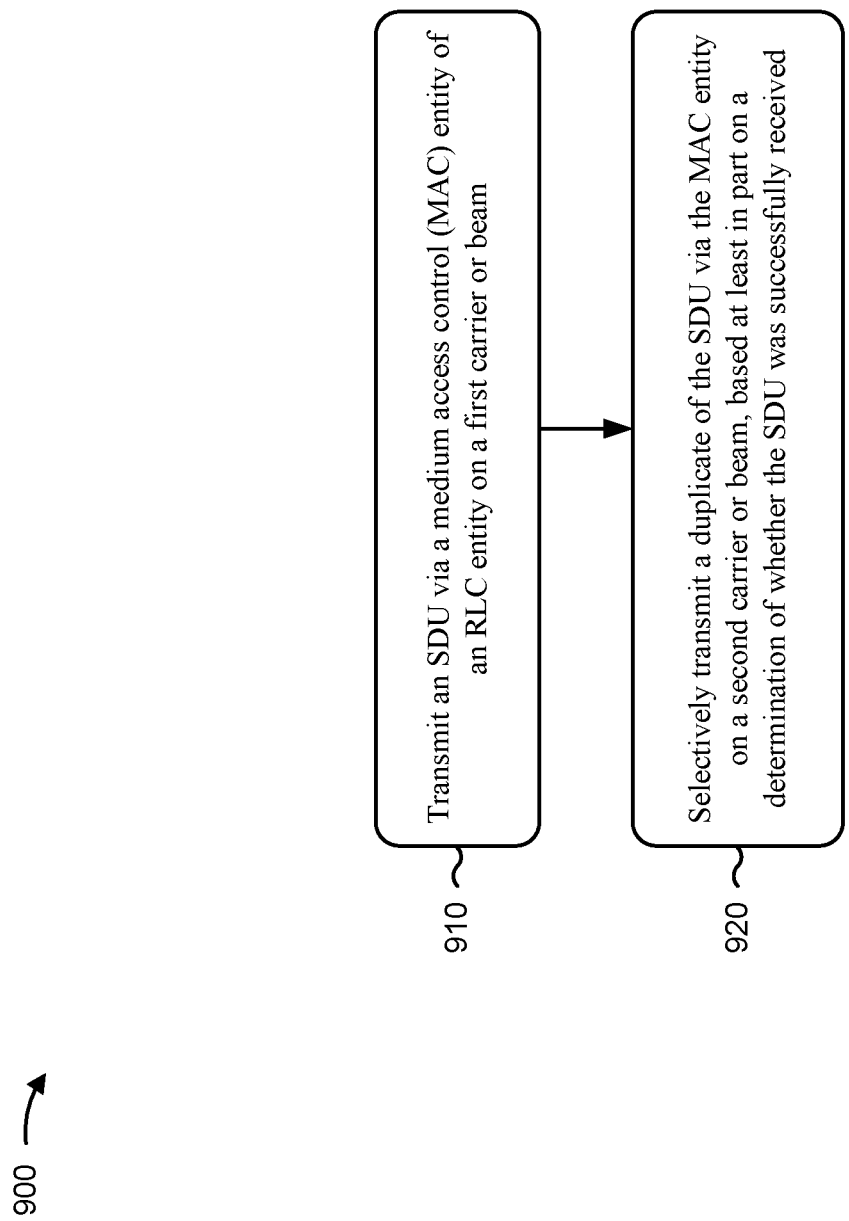

REASSEMBLY OF SERVICE DATA UNITS FOR RADIO LINK CONTROL DUPLICATION

CROSS-REFERENCE TO RELATED APPLICATION

This Patent Application claims priority to U.S. Provisional Patent Application No. 62/956,106, filed on Dec. 31, 2019, entitled "REASSEMBLY OF SERVICE DATA UNITS FOR RADIO LINK CONTROL DUPLICATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for reassembly of service data units for radio link control duplication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a receiving device, may include receiving, via a first radio link control (RLC) entity, one or more first protocol data units (PDUs) encapsulating a first portion of a service data unit (SDU) and receiving, via a second RLC entity, one or more second PDUs encapsulating a second portion of the SDU. The one or more second PDUs may be associated with duplication of the one or more first PDUs. The method may include assembling, based at least in part on a determination that neither the first portion nor the second portion is a complete version of the SDU, a combined SDU from the first portion and the second portion.

In some aspects, a method of wireless communication, performed by a transmitting device, may include transmitting an SDU via a medium access control (MAC) entity of an RLC entity on a first carrier or beam and selectively transmitting a duplicate of the SDU via the MAC entity on a second carrier or beam, based at least in part on a determination of whether the SDU was successfully received.

In some aspects, a receiving device for wireless communication may include memory and one or more processors operatively coupled to the memory. The memory and the one or more processors may be configured to receive, via a first RLC entity, one or more first PDUs encapsulating a first portion of an SDU and receive, via a second RLC entity, one or more second PDUs encapsulating a second portion of the SDU. The one or more second PDUs may be associated with duplication of the one or more first PDUs. The memory and the one or more processors may be configured to assemble, based at least in part on a determination that neither the first portion nor the second portion is a complete version of the SDU, a combined SDU from the first portion and the second portion.

In some aspects, a transmitting device for wireless communication may include memory and one or more processors operatively coupled to the memory. The memory and the one or more processors may be configured to transmit an SDU via a MAC entity of an RLC entity on a first carrier or beam and selectively transmit a duplicate of the SDU via the second MAC entity on a second carrier or beam, based at least in part on a determination of whether the SDU was successfully received.

In some aspects, a non-transitory computer-readable medium may store one or more instructions for wireless communication. The one or more instructions, when executed by one or more processors of a receiving device, may cause the one or more processors to receive, via a first RLC entity, one or more first PDUs encapsulating a first portion of an SDU and receive, via a second RLC entity, one or more second PDUs encapsulating a second portion of the SDU. The one or more second PDUs may be associated with duplication of the one or more first PDUs. The one or more instructions, when executed by the one or more processors of a receiving device, may cause the one or more processors to assemble, based at least in part on a determination that neither the first portion nor the second portion is a complete version of the SDU, a combined SDU from the first portion and the second portion.

In some aspects, a non-transitory computer-readable medium may store one or more instructions for wireless communication. The one or more instructions, when executed by one or more processors of a transmitting device, may cause the one or more processors to transmit an SDU via a MAC entity of an RLC entity on a first carrier or beam and selectively transmit a duplicate of the SDU via the MAC entity on a second carrier or beam, based at least in part on a determination of whether the SDU was successfully received.

In some aspects, an apparatus for wireless communication may include means for receiving, via a first RLC entity, one or more first PDUs encapsulating a first portion of an SDU, means for receiving, via a second RLC entity, one or more second PDUs encapsulating a second portion of the SDU, where the one or more second PDUs are associated with duplication of the one or more first PDUs, and means for assembling, based at least in part on a determination that neither the first portion nor the second portion is a complete version of the SDU, a combined SDU from the first portion and the second portion.

In some aspects, an apparatus for wireless communication may include means for transmitting an SDU via a MAC entity of an RLC entity on a first carrier, and means for selectively transmitting a duplicate of the SDU via the MAC entity on a second carrier or beam, based at least in part on a determination of whether the SDU was successfully received.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a receiving device, in accordance with various aspects of the present disclosure.

FIG. 9 is a diagram illustrating an example process performed, for example, by a transmitting device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
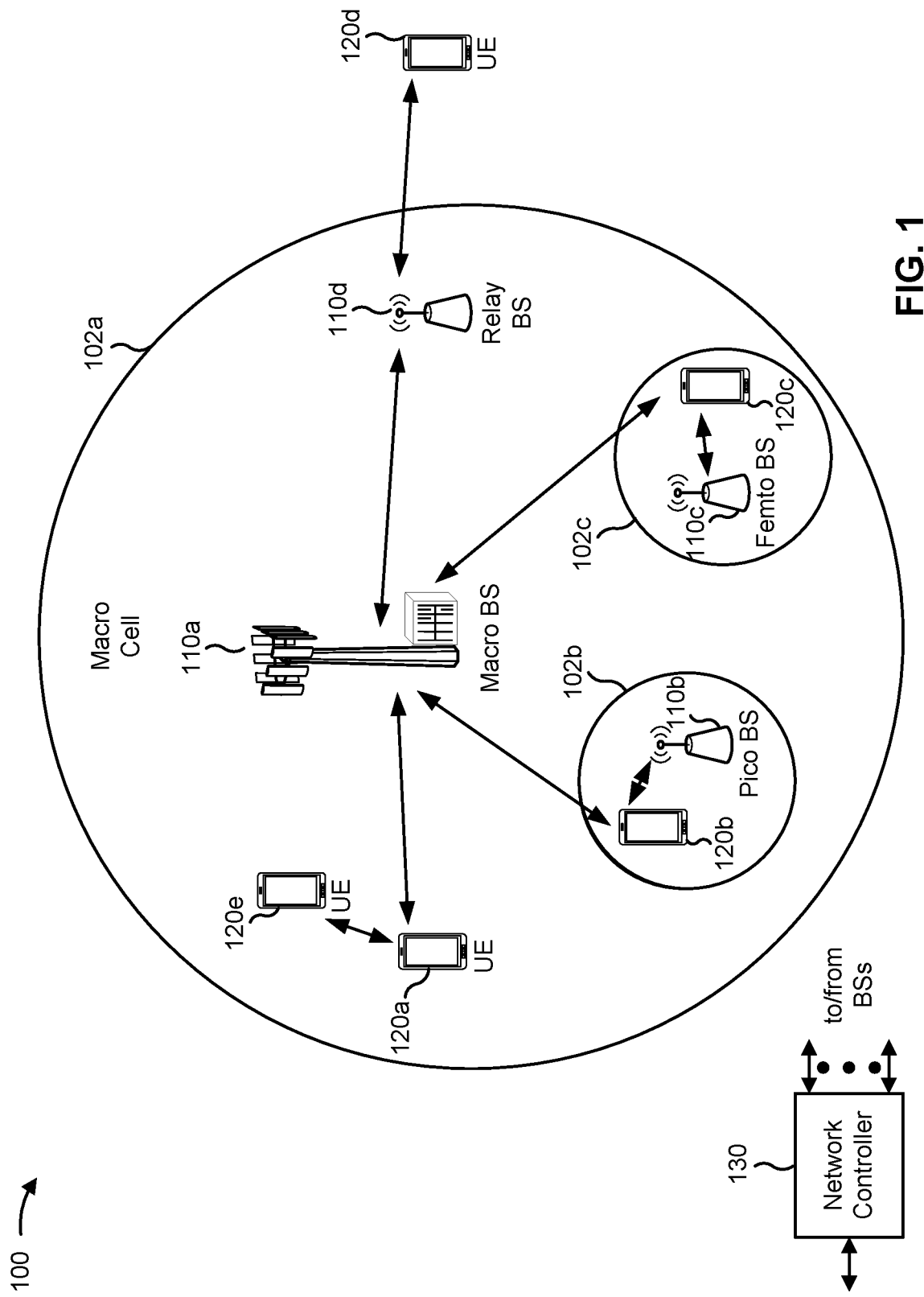
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
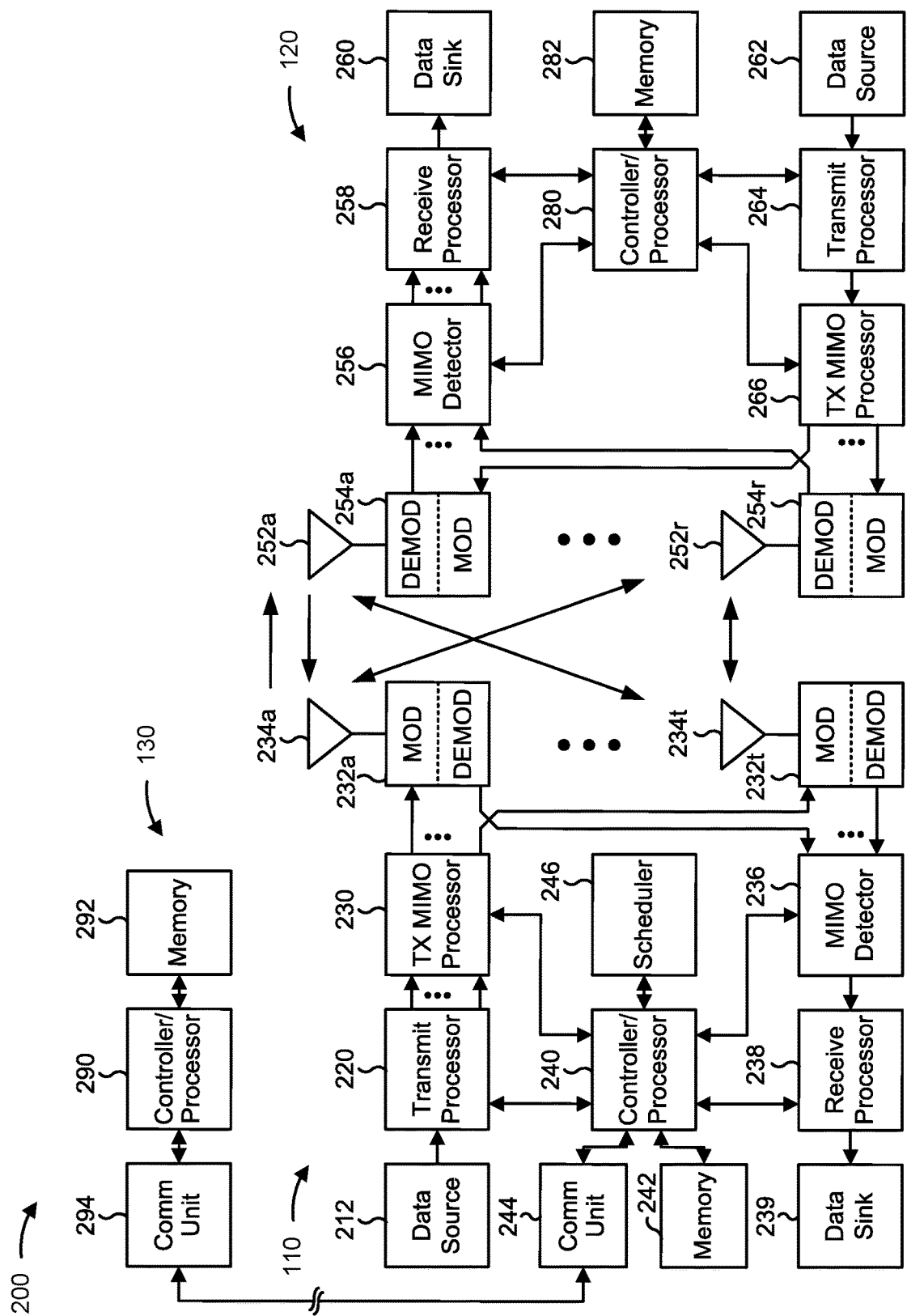
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reassembly of service data units (SDUs) for radio link control (RLC) duplication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving, via a first RLC entity, one or more first packet data units (PDUs) encapsulating a first portion of an SDU, means for receiving, via a second RLC entity, one or more second PDUs encapsulating a second portion of the SDU, where the one or more second PDUs are associated with duplication of the one or more first PDUs, means for assembling, based at least in part on a determination that neither the first portion nor the second portion is a complete version of the SDU, a combined SDU from the first portion and the second portion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for transmitting an SDU via a medium access control (MAC) entity of an RLC entity on a first carrier or beam and selectively transmitting a duplicate of the SDU via the MAC entity on a second carrier or beam, based at least in part on a determination of whether the SDU was successfully received, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, via a first RLC entity, one or more first PDUs encapsulating a first portion of an SDU, means for receiving, via a second RLC entity, one or more second PDUs encapsulating a second portion of the SDU, where the one or more second PDUs are associated with duplication of the one or more first PDUs, means for assembling, based at least in part on a determination that neither the first portion nor the second portion is a complete version of the SDU, a combined SDU from the first portion and the second portion, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for means for transmitting an SDU via a MAC entity of an RLC entity on a first carrier and selectively transmitting a duplicate of the SDU via the MAC entity on a second carrier or beam, based at least in part on a determination of whether the SDU was successfully received, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Packet data convergence protocol (PDCP) transmission may involve transmitting PDUs that encapsulate SDUs. The SDUs may include content, and the PDUs may include the SDUs and headers to help transport the SDUs to a receiving device. An SDU may be segmented among separate PDUs.

PDCP duplication involves transmitting PDUs on a first carrier while simultaneously transmitting duplicates of the PDUs on a second carrier. PDCP duplication may improve reliability for low latency services and signaling radio bearers. If a PDU on one carrier is lost, a receiving device may expect a duplicate of the PDU on another carrier. To improve a tradeoff between channel use efficiency and a requirement by some services for low latency, PDU duplication may be handled at lower layers, such as at an RLC layer. This may be referred to as RLC duplication.

RLC duplication may be configured by radio resource control (RRC) messages and may be configured per radio bearer. An RLC layer may have an RLC entity that uses a logical channel of a radio bearer to transmit PDUs, and successful or unsuccessful PDUs may be indicated in an RLC status report. When duplication is configured, a secondary RLC entity and a secondary logical channel are added to the radio bearer to handle duplicate PDUs. A MAC entity may manage activation and deactivation of duplication using a MAC control element (CE). The two logical channels can either belong to the same MAC entity (such as for carrier aggregation) or to different MAC entities (such as for dual connectivity). For each logical channel, RRC may be used to control mapping restrictions for logical channel prioritization (LCP). For example, lcp-allowedServingCells may be used to configure allowed cells for transmission.

While RLC duplication may provide some efficiency benefits for PDCP duplication, PDU retransmissions for unsuccessfully received SDUs may use additional power resources as well as additional processing and signalling resources. In various aspects described herein, a receiving device may assemble an SDU from a first portion received in a PDU on a first carrier and a second portion from a duplicate of the PDU received on a second carrier. In this way, a retransmission of one or more PDUs to obtain the SDU may be avoided. A receiving device and a corresponding transmitting device may save resources that would otherwise be spent requesting and providing a retransmission of PDUs. Additionally, or alternatively, a receiving device may request retransmission of a PDU, if necessary, but for only a missing portion of an SDU that the receiving device was not able to assemble from the first portion and the second portion.

In another scenario, a transmitting device may use a single RLC entity with a single MAC entity or split MAC entities, where PDUs (encapsulating SDUs) are transmitted via a MAC entity on a first carrier and duplicate PDUs (encapsulating duplicate SDUs) are transmitted via the MAC entity on a second carrier. The transmitting device may expend a lot of resources (power, signalling resources, processing resources) transmitting duplicate MAC SDUs. These resources may be wasted if the transmitting device may be receiving acknowledgements (ACKs) indicating that both an original MAC SDU and a duplicate MAC SDU are received at a receiving device. The receiving device may also waste resources receiving the duplicate MAC SDU and transmitting an ACK for the duplicate MAC SDU.

In various aspects described herein, a transmitting device may refrain from preparing and/or transmitting a duplicate MAC SDU. The transmitting device may wait for an ACK that results from transmitting an original MAC SDU. If an ACK is received for the original MAC SDU, or if there is some other indication that the original MAC SDU was successfully received, the transmitting device may not transmit a duplicate MAC SDU. In this way, the transmitting device may save its resources and resources of a receiving device. Furthermore, the transmitting device may free up channel resources as there are less duplicate MAC SDUs on the channels. While there may be an additional delay before transmitting the duplicate MAC SDU if the duplicate MAC SDU is needed, responding to hybrid automatic repeat request (HARD) feedback is faster than responding to an RLC status report.

Figure 3:
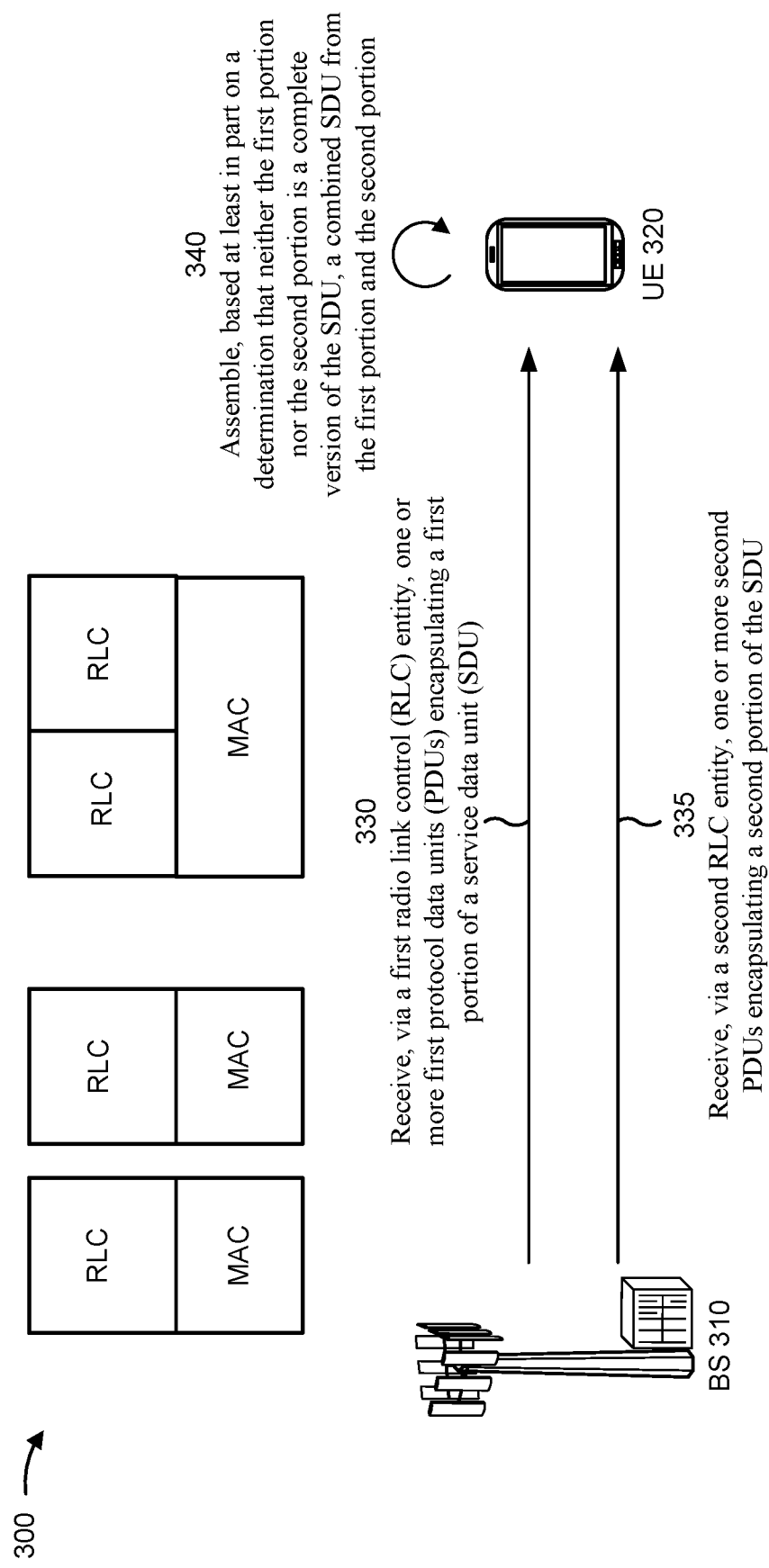
FIG. 3 is a diagram illustrating an example of reassembly of SDUs for radio link control (RLC) duplication, in accordance with various aspects of the present disclosure.

FIG. 3 is a diagram illustrating an example 300 of reassembly of SDUs for RLC duplication, in accordance with various aspects of the present disclosure. FIG. 3 shows a transmitting device that may communicate with a receiving device. In the example of FIG. 3, the transmitting device may be a base station (BS) 310 (e.g., BS 110 depicted in FIGS. 1 and 2) and the receiving device may be a UE 320 (e.g., UE 120 depicted in FIGS. 1 and 2). In another scenario, BS 310 may be the receiving device and UE 320 may be the transmitting device.

As shown in FIG. 3, BS 310 may transmit communications to UE 320 using duplication, such as RLC duplication. For example, as shown by reference number 330, UE 320 may receive, via a first RLC entity, one or more first PDUs encapsulating a first portion of an SDU. As shown by reference number 335, UE 320 may receive, via a second RLC entity, one or more second PDUs encapsulating a second portion of the SDU. The second PDUs may be associated with duplication of the first PDUs. In some aspects, the RLC duplication may use separate MAC entities for separate RLC legs. In some aspects, the RLC duplication use a same MAC entity.

As shown by reference number 340, UE 320 may assemble a combined SDU from the first portion and the second portion, based at least in part on a determination that neither the first portion nor the second portion is a complete version of the SDU. For example, UE 320 may have cross-RLC functionality to jointly consider PDUs that are received on a first RLC entity and PDUs that are received on a second RLC entity. UE 320 may determine whether the complete version of the SDU is received by determining how much of an SDU is received in separate portions of the SDU. UE 320 may know a size of an SDU, or may use serial numbers or other identifying information to determine what content is missing from an SDU. UE 320 may be able to identify what data of the SDU is necessary for the complete version of the SDU. UE 320 may combine the first portion and the second portion, excluding duplicate data. This may involve adding to the first portion data from the second portion that is not found in the first portion, or adding data from the first portion not found in the second portion to the second portion.

As indicated above, FIG. 3 is provided as an example. Other examples may differ from what is described with respect to FIG. 3.

Figure 4:
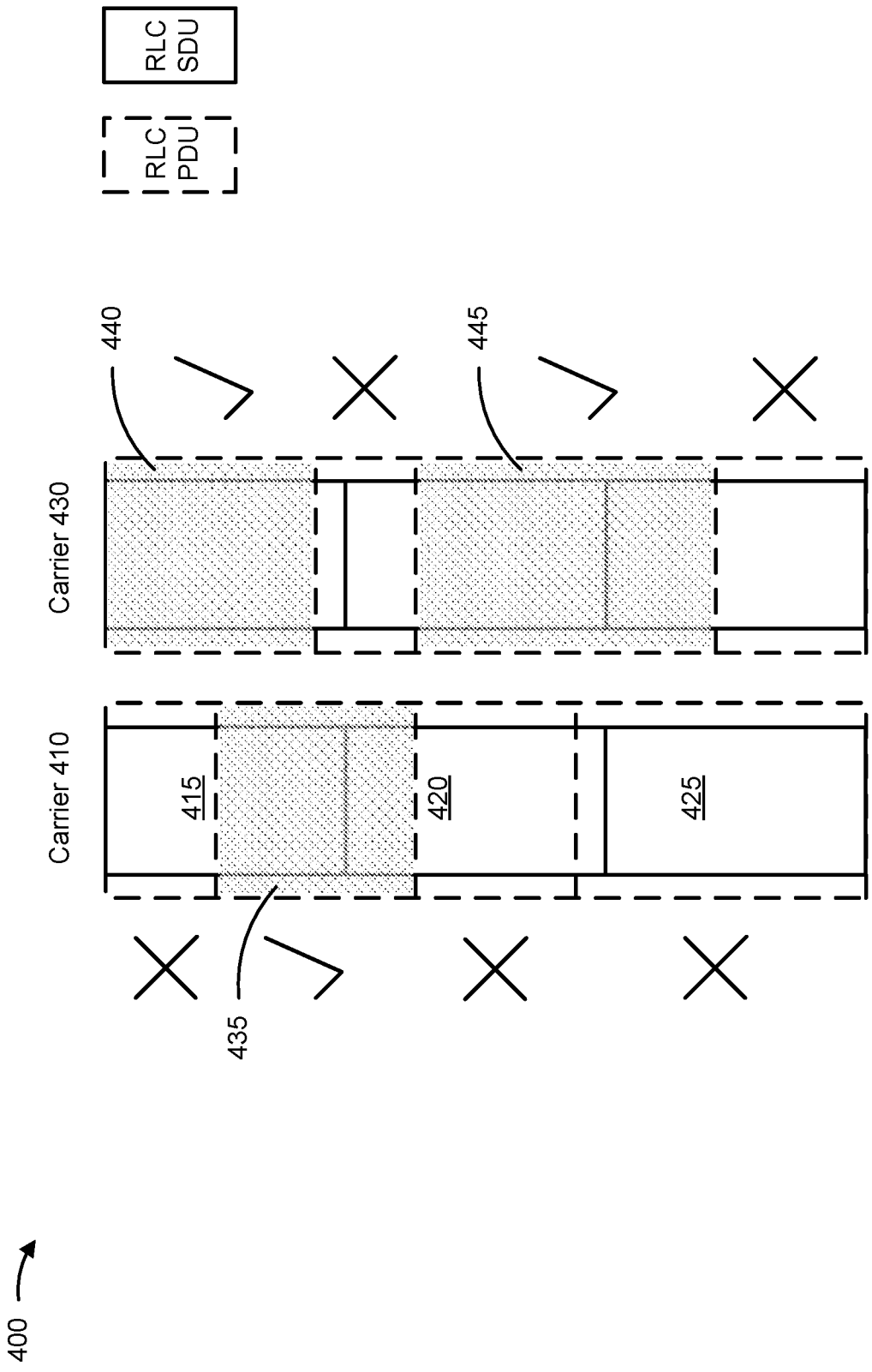
FIG. 4 is a diagram illustrating an example of reassembly of SDUs for RLC duplication, in accordance with various aspects of the present disclosure.

FIG. 4 is a diagram illustrating an example 400 of reassembly of SDUs for RLC duplication, in accordance with various aspects of the present disclosure.

A transmitting device, such as BS 310 or UE 320, may transmit PDUs on a first carrier 410 that encapsulate, for example, a first SDU 415, a second SDU 420, and a third SDU 425. The transmitting device may also simultaneously transmit duplicates of these PDUs on a second carrier 430.

The receiving device may successfully receive some PDUs, such as PDU 435 on carrier 410, PDU 440 on carrier 430, and PDU 445 on carrier 430. As shown in FIG. 4, some PDUs may not be successful. Successful PDUs 435, 440, and 445 may carry portions of SDUs. For example, the receiving device may receive a first portion of SDU 415 in PDU 440 on carrier 430 and a second portion of SDU 415 in PDU 435 on carrier 410. The receiving device may determine that a complete version of SDU 415 was not received on a single carrier. That is, neither the first portion nor the second portion is a complete version of SDU 415. The receiving device may assemble a complete version of SDU 415 from the first portion from PDU 440 and the second portion from PDU 435. For example, the receiving device may combine data of the first portion and data of the second portion, where duplicative data is excluded, to assemble a combined SDU that is a complete version of SDU 415. No retransmission of SDU 415 may be necessary. Additionally, or alternatively, the receiving device may assemble SDU 420 from PDU 435 on carrier 410 and PDU 445 on carrier 430.

In some aspects, the receiving device may not be able to recover SDU 425, and the receiving device may request retransmission of one or more PDUs with SDU 425.

In some aspects, these operations may involve different beams rather than different carriers. Transmission on different beams may be another way of accomplishing diversity of transmission and RLC duplication. Transmission on a different beam may include using a different antenna and/or a different beam configuration (e.g., transmission configuration indicator).

As indicated above, FIG. 4 is provided as an example. Other examples may differ from what is described with respect to FIG. 4.

Figure 5:
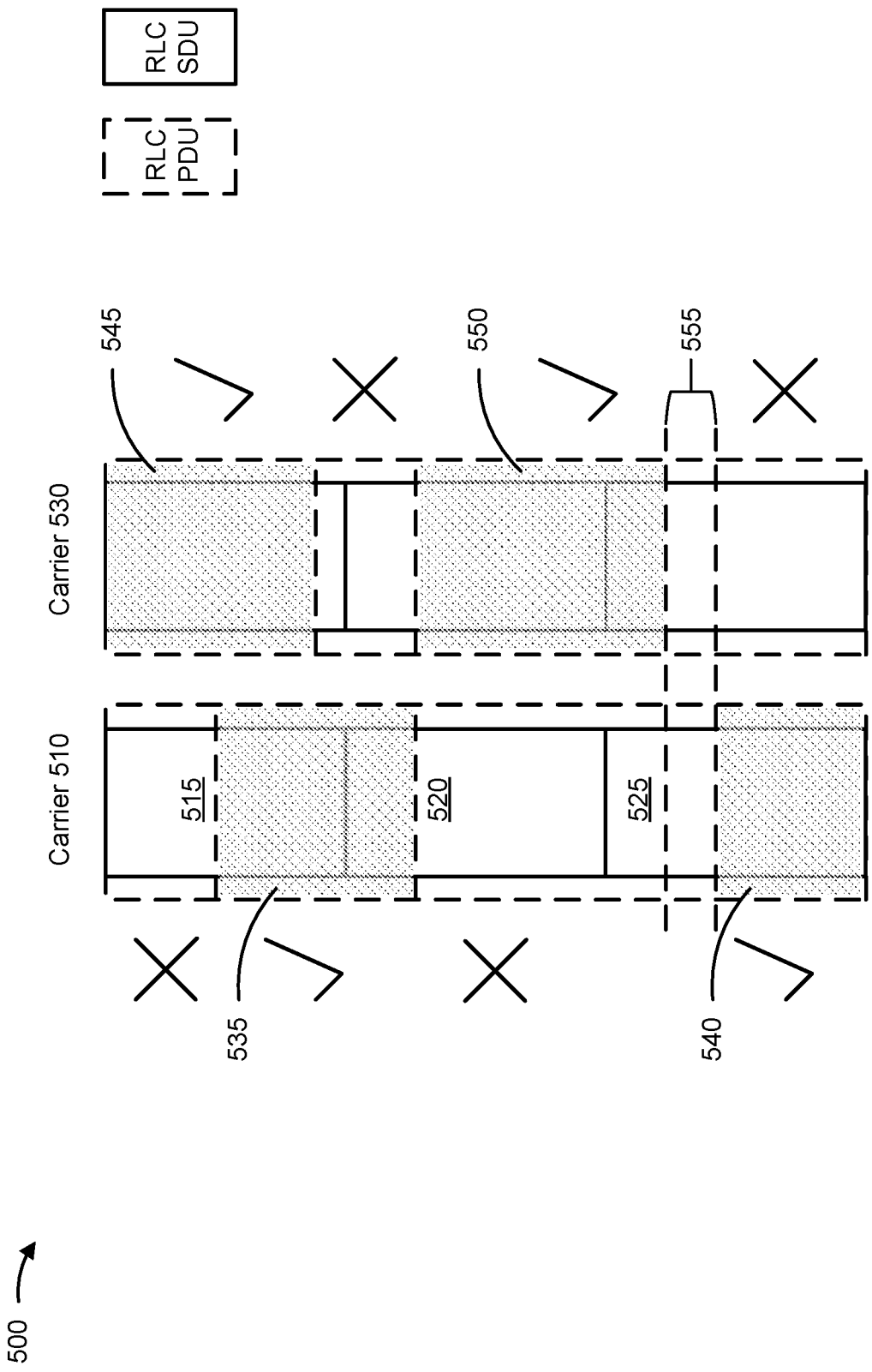
FIG. 5 is a diagram illustrating an example of reassembly of SDUs for RLC duplication, in accordance with various aspects of the present disclosure.

FIG. 5 is a diagram illustrating an example 500 of reassembly of SDUs for RLC duplication, in accordance with various aspects of the present disclosure.

A transmitting device, such as BS 310 or UE 320, may transmit PDUs on a first carrier 510 that encapsulate a first SDU 515, a second SDU 520, and a third SDU 525. The transmitting device may also transmit duplicates of the PDUs, simultaneously on a second carrier 530.

The receiving device may successfully receive some PDUs, such as PDU 535 on carrier 510, PDU 540 on carrier 530, PDU 545 on carrier 530, and PDU 550 on carrier 530. As shown in FIG. 5, some PDUs may not be successfully received. Successful PDUs 535, 540, 545, and 550 may carry portions of SDUs. For example, the receiving device may receive a first portion of SDU 525 in PDU 550 on carrier 530 and a second portion of SDU 525 in PDU 540 on carrier 510. In some aspects, the first portion of SDU 525 in PDU 550 may be received on a second beam and the second portion of SDU 525 in PDU 540 may be received on a first beam.

The receiving device may determine that a complete version of SDU 525 was not received on a single carrier or beam. For example, neither the first portion nor the second portion is a complete version of SDU 525. The receiving device may also determine that the receiving device may not be able to assemble a complete version of SDU 525 from the first portion from PDU 550 and the second portion from PDU 540. This may be because there is a portion 555 that is missing from both the first portion and the second portion of SDU 525. The receiving device may request a retransmission of only portion 555, rather than all of SDU 525. The receiving device may receive portion 555 and combine portion 555 with the first portion and the second portion to assemble a complete version of SDU 525.

In some aspects, an SDU may include up to a maximum quantity of octets. An octet may include 8 bits (e.g., a byte). An SDU may include, for example, up to 8188 octets. In some scenarios, such as for narrow band internet-of-things (NB-IoT), an SDU may have fewer octets (e.g., 1500 octets). The receiving device may determine which octets of the complete version of SDU 525 are missing from a combined SDU assembled from the first portion and the second portion. The receiving device may request retransmission of the octets missing from the combined SDU.

In some aspects, data within an SDU may be indicated by sequence numbers (SNs). The receiving device may determine which SNs of the complete version of SDU 525 are missing from a combined SDU assembled from the first portion and the second portion. The receiving device may request retransmission of the SNs missing from the combined SDU.

As indicated above, FIG. 5 is provided as an example. Other examples may differ from what is described with respect to FIG. 5.

Figure 6:
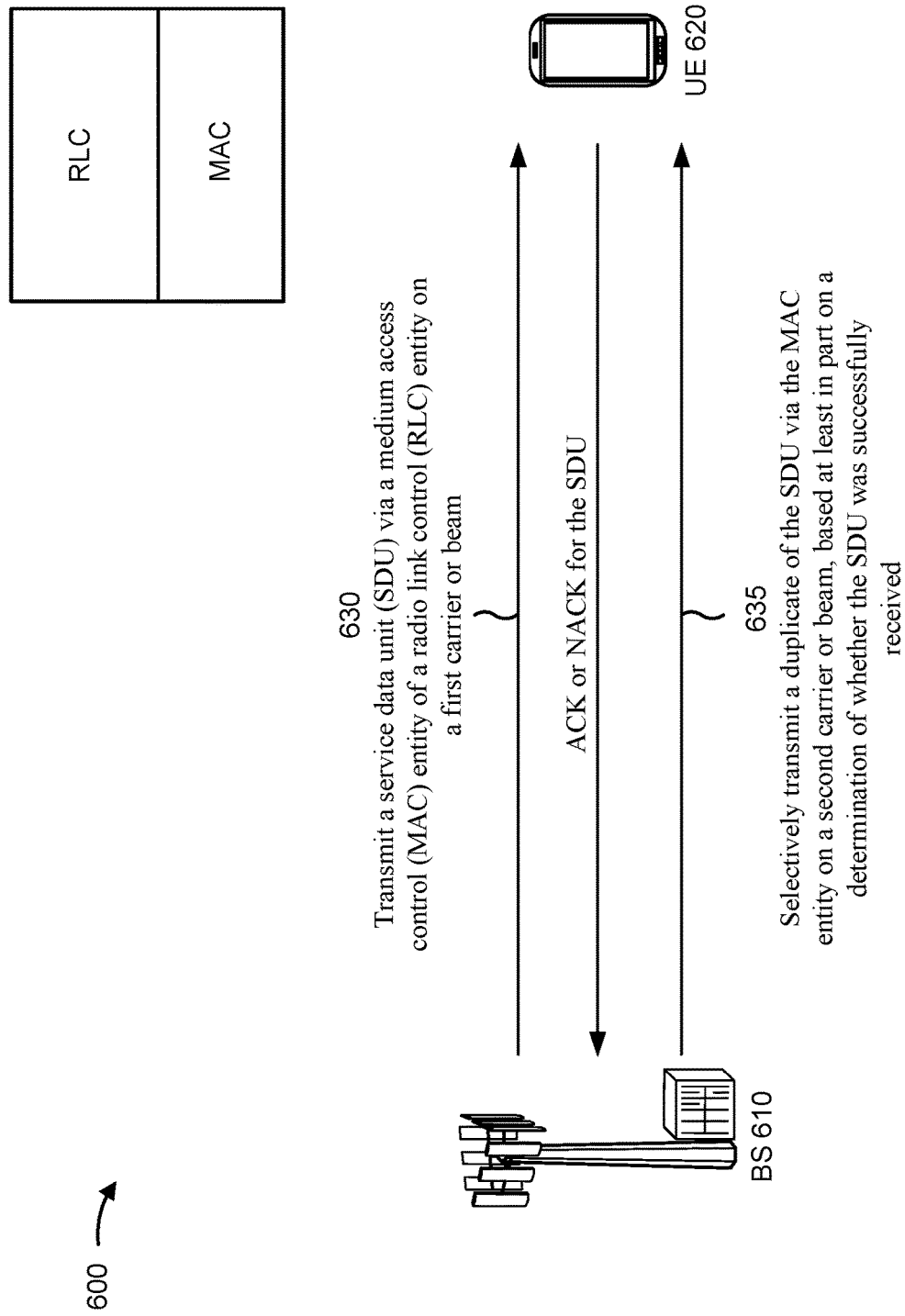
FIG. 6 is a diagram illustrating an example of medium access control (MAC) SDU duplication, in accordance with various aspects of the present disclosure.

FIG. 6 is a diagram illustrating an example 600 of MAC SDU duplication, in accordance with various aspects of the present disclosure. FIG. 6 shows a transmitting device that may communicate with a receiving device. In example 600 of FIG. 6, the transmitting device is a BS 610 (e.g., BS 110 depicted in FIGS. 1 and 2) and the receiving device is a UE 620 (e.g., UE 120 depicted in FIGS. 1 and 2). In another example, BS 610 may be the receiving device and UE 620 may be the transmitting device.

A single RLC entity for a PDCP instance may have a single MAC entity or split MAC entities. BS 610 may transmit PDUs (encapsulating SDUs) via a MAC entity on a first carrier or beam and transmit duplicate PDUs (encapsulating duplicate SDUs) via the MAC entity (or a second MAC entity of the RLC entity) on a second carrier or beam. In some aspects, BS 610 may delay transmission of a duplicate SDU (in a duplicate PDU) in case an acknowledgement is received for an original SDU. A duplicate SDU may not be needed.

For example, as shown by reference number 630, BS 610 may transmit an SDU via a MAC entity of an RLC entity on a first carrier or beam. BS 610 may receive a HARQ ACK from UE 620.

As shown by reference number 635, BS 610 may selectively transmit a duplicate of the SDU via the MAC entity on a second carrier or beam based at least in part on a determination of whether the SDU was successfully received. If BS 610 receives an ACK from UE 620, BS 610 may not generate and transmit a duplicate SDU. If a duplicate SDU was prepared, BS 610 may refrain from transmitting the duplicate SDU and may discard the duplicate SDU. If ACK reliability may be an issue for downlink transmission, BS 610 may be configured to transmit a duplicate SDU if no ACK is received. Duplicate SDUs may be discarded or transmitted as soon as a HARQ response is received. Response at a HARQ level may lead to faster early termination of duplicate MAC SDUs and better efficiency.

Alternatively, if BS 610 does not receive an ACK or receives a negative acknowledgment (NACK), BS 610 may prepare and transmit a duplicate SDU to UE 620. In some aspects, BS 610 may tag duplicated MAC SDUs in order to track MAC SDUs over multiple carriers to determine whether SDUs are being received. In some aspects, BS 610 may request retransmission of the SDU from the RLC entity. The retransmission of the SDU may be considered to be the duplicate of the SDU.

In some aspects, the SDU may be segmented into multiple segments and BS 610 may transmit a duplicate of only a certain segment or segments of the SDU. This may help to overcome scheduling restrictions that may arise in a case of autonomous UE duplication activation. BS 610 may also intentionally offset packet transmissions of duplicate SDUs. While this scheme may introduce an initial delay HARQ round trip time) of a copy, the scheme may provide more efficient operation as compared to normal RLC duplication with split MAC entities.

As indicated above, FIG. 6 is provided as an example. Other examples may differ from what is described with respect to FIG. 6.

Figure 7:
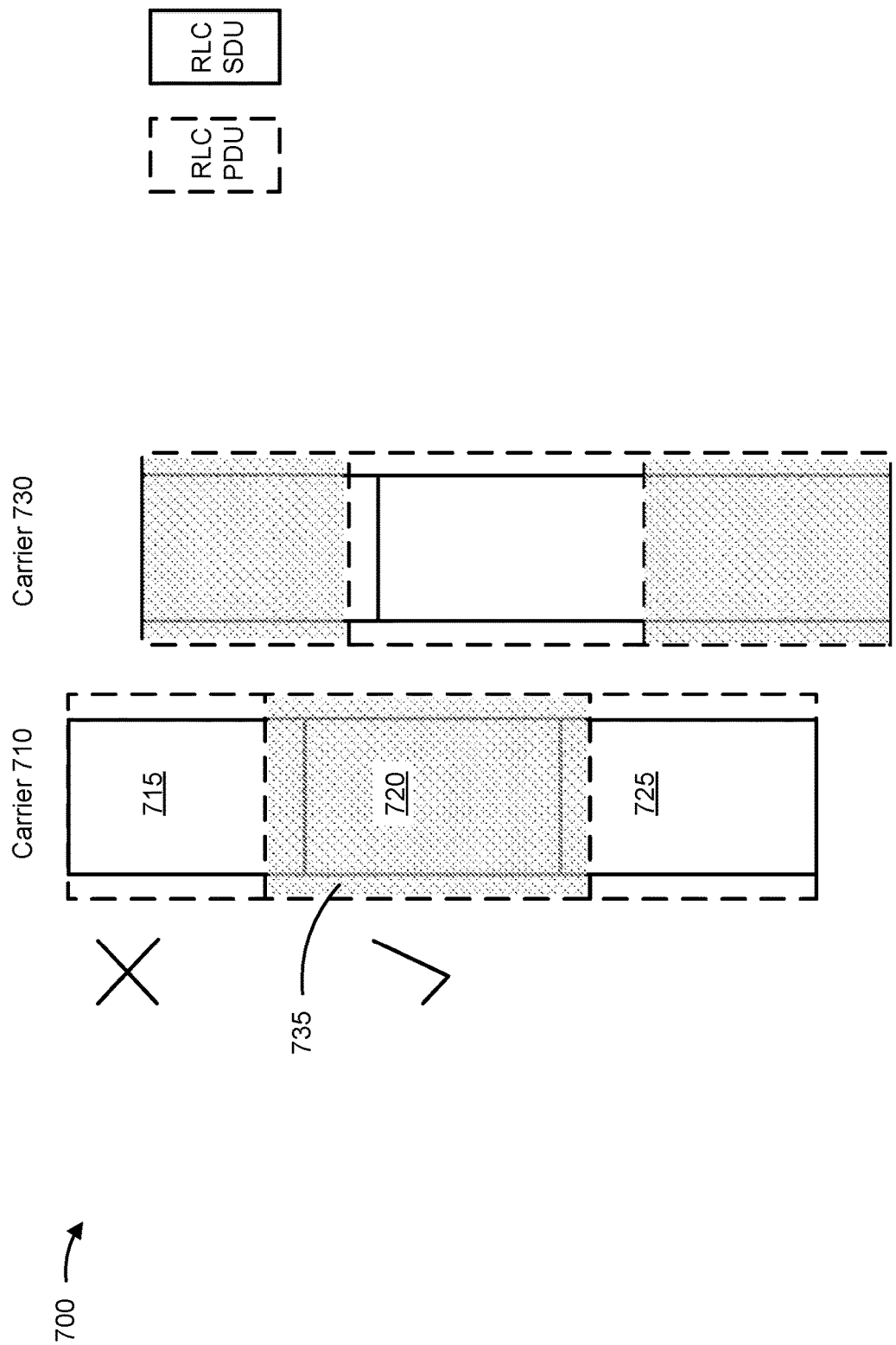
FIG. 7 is a diagram illustrating an example of MAC SDU duplication, in accordance with various aspects of the present disclosure.

FIG. 7 is a diagram illustrating an example 700 of MAC SDU duplication, in accordance with various aspects of the present disclosure.

A transmitting device, such as BS 610 or UE 620, may transmit PDUs, on a first carrier 710, that encapsulate a first SDU 715, a second SDU 720, and a third SDU 725. SDUs on the first carrier 710 may be transmitted via a MAC entity. A receiving device, such as BS 610 or UE 610, may unsuccessfully receive some PDUs, such as a PDU for SDU 715 on carrier 710. The transmitting device may not receive an ACK or may receive a NACK. The transmitting device may prepare and transmit a duplicate of SDU 715 on a second carrier 730 via the MAC entity. The receiving device may receive a duplicate of SDU 715, or the receiving device may assemble a complete version of SDU 715 from what was originally received of SDU 715 and what is received from the duplicate of SDU 715.

In some aspects, the transmitting device may transmit a PDU 735 for SDU 720 that is successfully received. The transmitting device may receive an ACK for PDU 735. The transmitting device may determine that no duplicate for SDU 720 needs to be transmitted and a duplicate may not be prepared, or the transmitting device may discard a prepared duplicate. In some aspects, the transmitting device may request, from the RLC entity, retransmission of the SDU.

As indicated above, FIG. 7 is provided as an example. Other examples may differ from what is described with respect to FIG. 7. While a base station is the transmitting device and the UE is the receiving device in the examples described in connection with FIGS. 3-7, in some aspects, the UE may be the transmitting device and the base station may be the receiving device.

FIG. 8 is a diagram illustrating an example process 800 performed, for example, by a receiving device, in accordance with various aspects of the present disclosure. Example process 800 is an example where the receiving device (e.g., BS 110 depicted in FIGS. 1 and 2, BS 310 depicted in FIG. 3, UE 120 depicted in FIGS. 1 and 2, UE 320 depicted in FIG. 3, and/or the like) performs operations associated with reassembly of SDUs for RLC duplication.

As shown in FIG. 8, in some aspects, process 800 may include receiving, via a first RLC entity, one or more first PDUs encapsulating a first portion of an SDU (block 810). For example, the receiving device (e.g., using receive processor 238 or 258, controller/processor 240 or 280, memory 242 or 282, and/or the like) may receive, via a first RLC entity, one or more first PDUs encapsulating a first portion of an SDU, as described above.

As further shown in FIG. 8, in some aspects, process 800 may include receiving, via a second RLC entity, one or more second PDUs encapsulating a second portion of the SDU (block 820). In some aspects, the one or more second PDUs are associated with duplication of the one or more first PDUs. For example, the receiving device (e.g., using receive processor 238 or 258, controller/processor 240 or 280, memory 242 or 282, and/or the like) may receive, via a second RLC entity, one or more second PDUs encapsulating a second portion of the SDU, as described above. In some aspects, the one or more second PDUs are associated with duplication of the one or more first PDUs.

As further shown in FIG. 8, in some aspects, process 800 may include assembling, based at least in part on a determination that neither the first portion nor the second portion is a complete version of the SDU, a combined SDU from the first portion and the second portion (block 830). For example, the receiving device (e.g., controller/processor 240 or 280, memory 242 or 282, and/or the like) may assemble, based at least in part on a determination that neither the first portion nor the second portion is a complete version of the SDU, a combined SDU from the first portion and the second portion, as described above.

Process 800 may include additional aspects, such as any single aspect or any combination of aspects described below and/or in connection with one or more other processes described elsewhere herein.

In a first aspect, the receiving via the first RLC entity and the receiving via the second RLC entity are associated with packet data convergence protocol duplication. In some aspects, the receiving via the first RLC entity and the receiving via the second RLC entity are associated with RLC duplication.

In a second aspect, alone or in combination with the first aspect, assembling the combined SDU includes combining data of the first portion and data of the second portion, where duplicative data is excluded.

In a third aspect, alone or in combination with one or more of the first and second aspects, process 800 includes requesting retransmission of one or more PDUs encapsulating the SDU, based at least in part on a determination that the combined SDU is not the complete version of the SDU.

In a fourth aspect, alone or in combination with one or more of the first through third aspects, assembling the combined SDU includes determining a missing portion of the complete version of the SDU that is missing from the combined SDU, requesting retransmission of the missing portion, receiving the missing portion, and combining the missing portion and the combined SDU to assemble the complete version of the SDU.

In a fifth aspect, alone or in combination with one or more of the first through fourth aspects, the SDU includes a plurality of octets, determining the missing portion includes determining which octets of the complete version of the SDU are missing from the combined SDU, and requesting retransmission of the missing portion includes requesting retransmission of the octets missing from the combined SDU.

In a sixth aspect, alone or in combination with one or more of the first through fifth aspects, the SDU includes a plurality of sequence numbers, determining the missing portion includes determining which sequence numbers of the complete version of the SDU are missing from the combined SDU, and requesting retransmission of the missing portion includes requesting retransmission of the sequence numbers missing from the combined SDU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a transmitting device, in accordance with various aspects of the present disclosure. Example process 900 is an example where the transmitting device (e.g., BS 110 depicted in FIGS. 1 and 2, BS 610 depicted in FIG. 6, UE 120 depicted in FIGS. 1 and 2, UE 620 depicted in FIG. 6, and/or the like) performs operations associated with MAC SDU duplication.

As shown in FIG. 9, in some aspects, process 900 may include transmitting an SDU via a MAC entity of an RLC entity on a first carrier or beam (block 910). For example, the transmitting device (e.g., using controller/processor 240 or 280, memory 242 or 282, transmit processor 220 or 264, and/or the like) may transmit an SDU via a MAC entity of an RLC entity on a first carrier or beam, as described above.

As shown in FIG. 9, in some aspects, process 900 may include selectively transmitting an SDU via the MAC entity on a second carrier or beam, based at least in part on a determination of whether the SDU was successfully received (block 920). For example, the transmitting device (e.g., using receive processor 238 or 258, controller/processor 240 or 280, memory 242 or 282, transmit processor 220 or 264, and/or the like) may selectively transmit an SDU via the MAC entity on a second carrier or beam, based at least in part on a determination of whether the SDU was successfully received, as described above.

Process 900 may include additional aspects, such as any single aspect or any combination of aspects described below and/or in connection with one or more other processes described elsewhere herein.

In a first aspect, selectively transmitting the duplicate includes preparing a duplicate of the SDU for transmission via the MAC entity on the second carrier or beam and canceling the transmission of the duplicate based at least in part on a determination that the SDU was successfully received.

In a second aspect, alone or in combination with the first aspect, process 900 includes discarding the duplicate.

In a third aspect, alone or in combination with one or more of the first and second aspects, the determination that the SDU was successfully received is based at least in part on receiving an acknowledgment message.

In a fourth aspect, alone or in combination with one or more of the first through third aspects, preparing the duplicate of the SDU for transmission includes segmenting the SDU into multiple MAC layer segments, and canceling the transmission of the duplicate includes canceling transmission of a duplicate of a MAC layer segment based at least in part on a determination that the MAC layer segment was successfully received.

In a fifth aspect, alone or in combination with one or more of the first through fourth aspects, selectively transmitting the duplicate includes preparing the duplicate of the SDU for transmission via the MAC entity on the second carrier or beam, based at least in part on a determination that the SDU was not successfully received, and transmitting the duplicate via the MAC entity.

In a sixth aspect, alone or in combination with one or more of the first through fifth aspects, the determination that the SDU was not successfully received is based at least in part on receiving a negative acknowledgment message.

In a seventh aspect, alone or in combination with one or more of the first through sixth aspects, preparing the duplicate of the SDU for transmission includes segmenting the SDU into multiple MAC layer segments, and transmitting the duplicate includes transmitting a duplicate of a MAC layer segment based at least in part on a determination that the MAC layer segment was not successfully received.

In a eighth aspect, alone or in combination with one or more of the first through seventh aspects, selectively transmitting the duplicate includes requesting retransmission of the SDU from the RLC entity.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a receiving device, comprising:
   receiving, via a first radio link control (RLC) entity and via a first beam, one or more first protocol data units (PDUs) encapsulating a first portion of a service data unit (SDU);
   receiving, via a second RLC entity and via a second beam, one or more second PDUs encapsulating a second portion of the SDU, wherein the one or more second PDUs are associated with duplication of the one or more first PDUs, and wherein the first portion and second portion are partially duplicate copies of each other and are not identical portions of the SDU; and
   assembling, based at least in part on a determination that neither the first portion nor the second portion is a complete version of the SDU, a combined SDU from the first portion and the second portion.

2. The method of claim 1, wherein the receiving via the first RLC entity and the receiving via the second RLC entity are associated with packet data convergence protocol duplication.

3. The method of claim 1, wherein assembling the combined SDU includes combining data of the first portion and data of the second portion, wherein duplicative data is excluded.

4. The method of claim 1, further comprising requesting retransmission of one or more PDUs encapsulating the SDU, based at least in part on a determination that the combined SDU is not the complete version of the SDU.

5. The method of claim 1, wherein assembling the combined SDU includes:
   determining a missing portion of the complete version of the SDU that is missing from the combined SDU;
   requesting retransmission of the missing portion;
   receiving the missing portion; and
   combining the missing portion and the combined SDU to assemble the complete version of the SDU.

6. The method of claim 5, wherein the SDU includes a plurality of octets and determining the missing portion includes determining which octets of the complete version of the SDU are missing from the combined SDU, and wherein requesting retransmission of the missing portion includes requesting retransmission of the octets missing from the combined SDU.

7. The method of claim 5, wherein the SDU includes a plurality of sequence numbers and determining the missing portion includes determining which sequence numbers of the complete version of the SDU are missing from the combined SDU, and wherein requesting retransmission of the missing portion includes requesting retransmission of the sequence numbers missing from the combined SDU.

8. A receiving device for wireless communication, comprising:
   a memory; and
   one or more processors coupled to the memory, the one or more processors configured to:
   receive, via a first radio link control (RLC) entity and via a first beam, one or more first protocol data units (PDUs) encapsulating a first portion of a service data unit (SDU);
   receive, via a second RLC entity and via a second beam, one or more second PDUs encapsulating a second portion of the SDU, wherein the one or more second PDUs are associated with duplication of the one or more first PDUs, and wherein the first portion and second portion are partially duplicate copies of each other and are not identical portions of the SDU; and
   assemble, based at least in part on a determination that neither the first portion nor the second portion is a complete version of the SDU, a combined SDU from the first portion and the second portion.

9. The receiving device of claim 8, wherein the receiving via the first RLC entity and the receiving via the second RLC entity are associated with packet data convergence protocol duplication.

10. The receiving device of claim 8, wherein the one or more processors, when assembling the combined SDU, are configured to combine data of the first portion and data of the second portion, wherein duplicative data is excluded.

11. The receiving device of claim 8, wherein the one or more processors are further configured to request retransmission of one or more PDUs encapsulating the SDU, based at least in part on a determination that the combined SDU is not the complete version of the SDU.

12. The receiving device of claim 8, wherein the one or more processors, when assembling the combined SDU, are configured to:
   determine a missing portion of the complete version of the SDU that is missing from the combined SDU;
   request retransmission of the missing portion;
   receive the missing portion; and
   combine the missing portion and the combined SDU to assemble the complete version of the SDU.

13. The receiving device of claim 12, wherein the SDU includes a plurality of octets and the one or more processors, when determining the missing portion, are configured to determine which octets of the complete version of the SDU are missing from the combined SDU, and wherein the one or more processors, when requesting retransmission of the missing portion, are configured to request retransmission of the octets missing from the combined SDU.

14. The receiving device of claim 12, wherein the SDU includes a plurality of sequence numbers and the one or more processors, when determining the missing portion, are configured to determine which sequence numbers of the complete version of the SDU are missing from the combined SDU, and wherein the one or more processors, when requesting retransmission of the missing portion, are configured to request retransmission of the sequence numbers missing from the combined SDU.

* * * * *